US006582835B2

(12) United States Patent
Antoni et al.

(10) Patent No.: US 6,582,835 B2
(45) Date of Patent: Jun. 24, 2003

(54) COATED FERRITE STAINLESS STEEL SHEET USABLE IN THE AUTOMOBILE EXHAUST SECTOR

(75) Inventors: Laurent Antoni, Pontcharra (FR); Raphael Craen, Albertville (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 09/819,608

(22) Filed: Mar. 29, 2001

(65) Prior Publication Data

US 2001/0032687 A1 Oct. 25, 2001

(30) Foreign Application Priority Data

Mar. 29, 2000 (FR) .............................. 0003962

(51) Int. Cl.$^7$ ............................ B32B 15/20; C21D 8/00
(52) U.S. Cl. ....................... 428/653; 148/531; 148/534; 148/610; 148/621; 181/227; 181/228; 181/244; 181/245; 420/40; 420/62; 420/79; 420/83; 420/103; 420/128; 420/129; 428/685; 428/939
(58) Field of Search ................... 428/653, 685, 428/939; 181/227, 228, 244, 245; 148/531, 534, 610, 621; 420/40, 62, 79, 83, 103, 128, 129

(56) References Cited

U.S. PATENT DOCUMENTS 5,591,531 A * 1/1997 Jasper ........................ 428/653
6,309,761 B1 * 10/2001 Guesdon et al. ............. 428/653

FOREIGN PATENT DOCUMENTS

| EP | 0 467 749 | 1/1992 | |
| EP | 0 688 882 | 12/1995 | |
| EP | 0 743 374 | 11/1996 | |
| JP | 4-314850 A | * 11/1992 | ............. C23C/2/12 |

OTHER PUBLICATIONS

Patent Abstracts of Japan, vol. 017, No. 146, Mar. 24, 1993, JPA 04,314,850, Nov. 6, 1992.
Patent Abstracts of Japan, vol. 016, No. 394, Aug. 21, 1992, JPA 04, 128,343, Apr. 28, 1992.
Patent Abstracts of Japan, vol. 018, No. 401, Jul. 27, 1994, JPA 06,116,652, Apr. 26, 1994.
Patent Abstracts of Japan, vol. 1998, No. 13, Nov. 30, 1998, JPA 10,226,861, Aug. 1998.
Patent Abstracts of Japan, vol. 1997, No. 07, Jul. 31, 1997, JPA 09,087,859, Mar. 31, 1997.
Patent Abstracts of Japan, vol. 1995, No. 02, Mar. 31, 1995, JPA 06,330,247, Nov. 29, 1994.

* cited by examiner

*Primary Examiner*—Robert R. Koehler
(74) *Attorney, Agent, or Firm*—Sughrue Mion, PLLC

(57) ABSTRACT

Dip-coated ferrite stainless steel sheet usable in the automobile exhaust sector, characterized in that it comprises a steel core with the following composition by weight:

10.5%≦chromium≦20%
0%≦aluminum≦0.6%
0.003%≦carbon≦0.06%
0.003%≦nitrogen≦0.04%
0%≦silicon≦0.6%
0%≦manganese≦0.6%
0%≦sulfur≦0.002% iron and impurities inherent in processing, and a metal coating deposited by dipping the strip in a molten metal bath containing in particular aluminum and at least one rare earth element: cerium, lanthanum, praseodymium, neodymium, mixed metal and/or yttrium.

25 Claims, 4 Drawing Sheets

COATED FERRITE STAINLESS STEEL SHEET USABLE IN THE AUTOMOBILE EXHAUST SECTOR

The invention relates to a dip-coated ferritic stainless steel sheet usable in the automobile exhaust sector.

Processes are known for improving the wettability of aluminum on metal sheets made up of chromium iron alloys. In European Patent No. 0 467 749, a process is described that eliminates the need to have very pure hydrogen in the aluminum alloying furnace. By preheating the metal sheet at less than 500° C. in a non-oxidizing atmosphere containing less than 3% oxygen and heating the metal sheet to a temperature of less than 950° C. in a second non-oxidizing atmosphere with a dew-point of less than –40° C., preferably less than –50° C.; the atmosphere in the annealing furnace and in the hood of the furnace does not have to be formed from pure hydrogen. The metal sheet can be placed in a non-reactive atmosphere, such as a nitrogen or nitrogen and hydrogen atmosphere. The nitrogen atmosphere has less than 20 ppm of oxygen and a dew-point of less than –60° C. The metal sheet is cooled off to roughly the temperature of the bath, and it is placed in the molten aluminum bath. An aluminum bath containing silicon reduces to a minimum the alloying layer of the interface and reduces the fragility of the coated metal sheet.

The goal of the present invention is to propose a stainless steel sheet comprising an aluminum coating, usable in the automobile exhaust sector and having improved oxidation resistance characteristics; with the metal sheet coated in this way is also able to be used to produce a catalyzer support strip.

The object of the invention is a dip-coated ferritic stainless steel sheet usable in the automobile exhaust sector, characterized in that it comprises a steel core with the following composition by weight:

- $10.5\% < \text{chromium} \leq 20\%$
- $0\% \leq \text{aluminum} \leq 0.6\%$
- $0.003\% \leq \text{carbon} \leq 0.06\%$
- $0.003\% \leq \text{nitrogen} \leq 0.03\%$
- $0\% \leq \text{silicon} \leq 0.6\%$
- $0\% \leq \text{manganese} \leq 0.6\%$
- $0\% \leq \text{sulfur} \leq 0.002\%$ iron and impurities inherent in processing, and a metal coating deposited by dipping the strip in a molten metal bath containing in particular aluminum and at least one rare earth element: cerium, lanthanum, praseodymium, neodymium, mixed metal and/or yttrium.

The other characteristics of the invention are:

- the steel has less than 18.5% chromium in its composition,
- the molten metal bath has a rare earth content, Ce, La, Pr, Nd, mixed metal and/or yttrium, taken alone or in a combination lower than 3.0%.
- the coating optionally comprises 6% to 13% silicon, the silicon being introduced into the molten metal bath of aluminum.
- the steel comprises less than 0.6% aluminum and less than 0.03% nitrogen, the carbon and nitrogen levels preferably conforming to the relationship: $(C+N) < 0.04\%$.
- the steel additionally comprises stabilizing elements: titanium, zirconium, niobium taken alone or in combination, at a level less than or equal to 0.6%.
- the steel additionally has in its composition less than 1.5% copper and/or less than 1% nickel and/or less than 5% molybdenum.

The coated ferritic stainless steel sheet of the invention is used in the automobile exhaust sector to manufacture components of said vehicle's exhaust pipe: tubes, mufflers sheaths and catalyzer cones.

The invention also relates to the use of coated ferrite stainless steel sheets in the automobile exhaust sector to manufacture a catalyzer support strip.

The purpose of the invention is also a process to produce a metal supporting strip for catalyzers from the coated metal sheet, a process in which:

- the coated metal sheet is cold-rolled in at least one rolling step to obtain a steel strip,
- the steel strip is annealed in a non-oxidizing atmosphere at a temperature of 600° C. to 1,200° C., preferably 800° C. to 1,000° C. so as to cause the metal of the coating to diffuse into the steel to form the strip.

The other characteristics of the invention are:

- the coated steel sheet is cold-rolled in two steps which may comprise an intermediate annealing, the second step being carried out with a rolling rate of 20% or more, ensuring final roughness Ra of less than 0.25 μm.
- the coated steel sheet is cold-rolled until reaching a final thickness of 30 to 50 μm.

According to another form of the process for producing a metal supporting strip for catalyzers from the coated metal sheet:

- the coated sheet is annealed in a non-oxidizing atmosphere at a temperature of 600° C. to 1,200° C., preferably 800° C. to 1,000° C., so as to cause the metal of the coating to diffuse into the steel.
- the metal sheet subjected to diffusion is rolled in at least one rolling step to obtain a strip.

The characteristics according to the forms of the invention are:

- the annealings are carried out in a hydrogen atmosphere with a dew point below –30° C., either statically or continuously.
- the final, softening annealing is carried out continuously at a temperature of 600° C. to 1,200° C., preferably 800° C. to 1,000° C.

The invention also relates to a strip usable in particular as an auto exhaust catalyzer support, characterized in that it has the following composition by weight:

- $10.5\% \leq \text{chromium} \leq 20\%$
- $0\% \leq \text{aluminum} \leq 8.0\%$
- $0.003\% \leq \text{carbon} \leq 0.06\%$
- $0.003\% \leq \text{nitrogen} \leq 0.03\%$
- $0\% \leq \text{silicon} \leq 0.6\%$
- $0\% \leq \text{manganese} \leq 0.6\%$
- $0\% \leq \text{sulfur} \leq 0.002\%$
- $0.001\% \leq$ rare earth, Ce, La, Pr, Nd, mixed metal and/or yttrium, taken alone or in combination $\leq 1.0\%$, iron and impurities inherent in processing and in which the chromium and aluminum levels conform to the relationship $\%Cr/\%Al < 5$.

The following description and the attached figures will make the invention understood.

Figure 1:
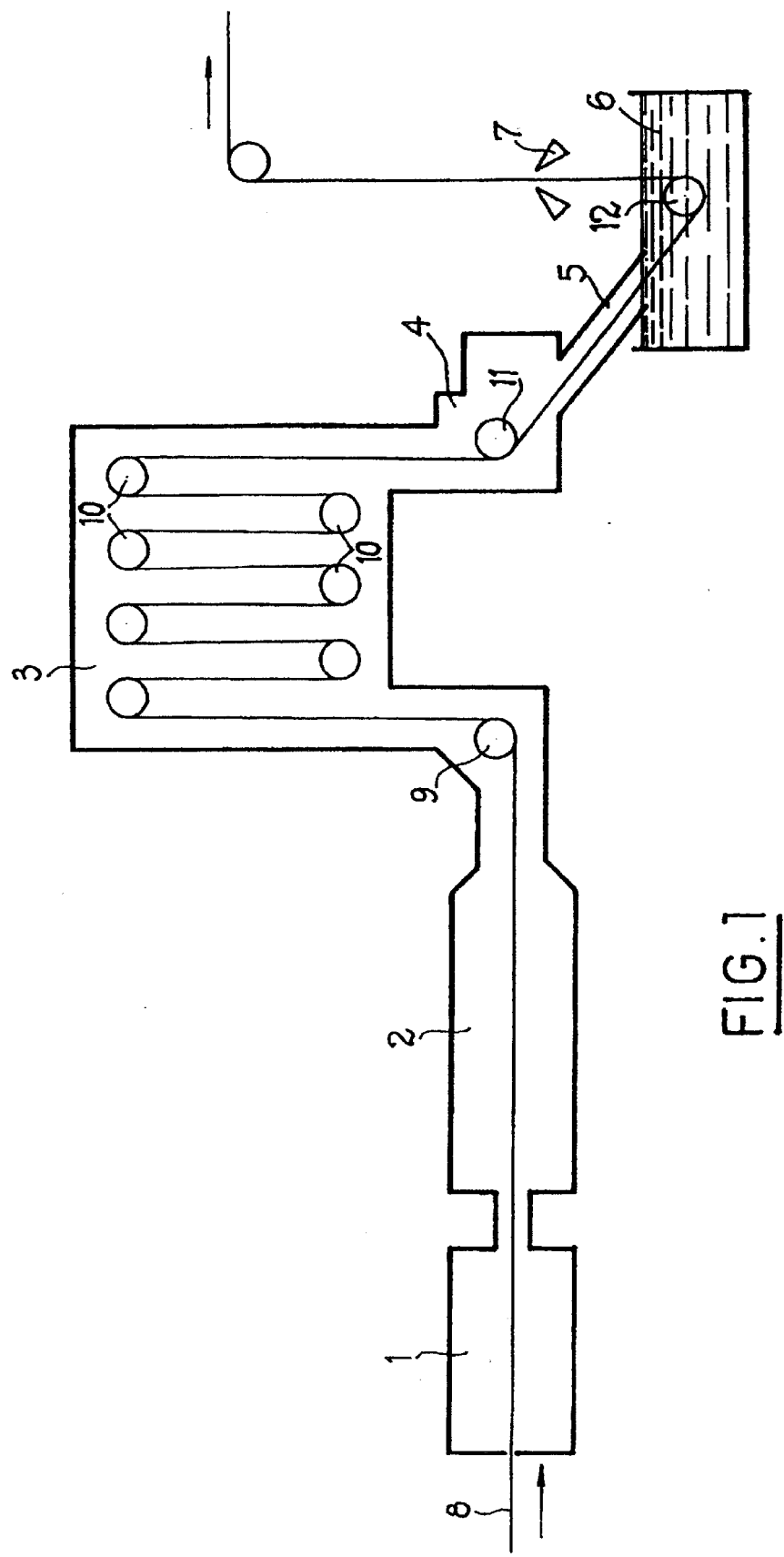
FIG. 1 is a diagram of a dip-coating line able to be used to produce the coated stainless steel according to the invention.

The dip-coated ferritic stainless steel sheet usable in the automobile exhaust sector is produced in a continuous coating facility comprising, as shown in FIG. 1:

a preheating furnace 1,
an annealing lab furnace 2,
a holding furnace 3,
a cooling zone,
a chute 5,
a liquid metal coating bath 6,
drying nozzles 7.

The ferritic stainless steel sheet 8 enters the facility through a preheating furnace 1, in which the atmosphere is a first non-oxidizing atmosphere. When exiting this preheating furnace, the temperature of the steel sheet 8 is less than 500° C. and preferably less than 460° C.; the dwell time of any portion of this metal sheet in this preheating furnace is less than 60 seconds and preferably less than 45 seconds. The function of this furnace is to break down the fine layer of oil covering the ferrite steel sheet before any treatment. This preheating operation may be eliminated if the steel sheet has been pretreated and no longer has this oily layer, for example after any kind of annealing operation before the furnace is used.

The sheet then runs through the lab furnace 2, is then evacuated by a roller 9 and enters the holding furnace 3 where it goes around the rollers 10. The atmosphere prevailing in the lab furnace 2 and in the holding furnace 3 consists of a second non-oxidizing atmosphere that is set primarily to have a dew-point below −40° C. and preferably below −50° C. at any point. The atmosphere may be nitrogen, hydrogen or a mixture of both.

Exiting the lab furnace 2, the strip's 8 temperature is less than 950° C., and the dwell time for any portion of this strip in this furnace is less than 120 seconds.

In the holding furnace 3, the temperature of the strip 8 is maintained below 950° C., and the dwell time for any portion of this strip in this furnace is less than 220 seconds.

Exiting the holding furnace 3, the sheet 8 enters the cooling zone 4 and is then evacuated by a roller 11, runs through the chute 5 and dips into the metal coating bath 6.

After being evacuated by a roller 12, the sheet 8 is then dried by gas blown through nozzles 7 and is removed.

In the cooling zone 4, the non-reactive atmosphere consists of nitrogen, hydrogen or a mixture of nitrogen and hydrogen and the temperature of the sheet is reduced to a level close to the metal coating bath 6 temperature, preferably 660° C. to 730° C.

In the chute 5, the sheet's 8 temperature hardly changes and the atmosphere of this chute is either pure nitrogen, or hydrogen, or a mixture of nitrogen and hydrogen.

The atmosphere of the chute contains less than 20 ppm oxygen and has a dew-point of less than −60° C.

Unlike the teaching previously known for coating a ferrite stainless steel sheet, where it is advised to absolutely have a reducing atmosphere, such as 95% hydrogen, it has been noted that the essential criterion for proper aluminum or aluminum alloy coating on a ferrite stainless steel sheet is the level of humidity of the atmosphere, thus requiring the dew-point, the humidity level or also the physical value of the dew-point to be as low as possible.

In these processing conditions, according to the invention a ferritic stainless steel sheet having the following composition by weight:

10.5%<chromium≦20%
0%≦aluminum≦0.6%
0.003%≦carbon≦0.06%
0.003%≦nitrogen≦0.03%
0%≦silicon≦0.6%
0%≦manganese≦0.5%
0%≦sulfur≦0.002% is coated with aluminum or an aluminum alloy by dipping in a molten metal bath comprising rare earth elements: cerium, lanthanum, praseodymium, a mixed metal that is a mixture of rare earths and/or yttrium. The bath's rare earth content is less than 3.0%.

The molten metal bath may also contain 6% to 13% silicon.

The steel of the sheet preferably has in composition by weight less than 18.5% chromium, less than 0.6% aluminum and less than 0.03% nitrogen, the carbon and nitrogen levels preferably conforming to the relationship: (C+N)<0.04%.

The steel of the sheet may additionally comprise stabilizing elements such as titanium, zirconium, or niobium taken alone or in combination, at a total level of 0.6% or less. The steel's composition may also have added less than 1.5% copper and/or less than 1% nickel and/or less than 1% molybdenum.

In this form of the invention, the metal sheet coated and containing in the coating metal or coating metal alloy a defined quantity of rare earths, has improved oxidation resistance characteristics.

The ferritic steel sheet coated with aluminum, with the aluminum having rare earth elements or yttrium in its composition, according to the invention can be used in this form to produce automobile exhaust pipe sheaths such as tubes, mufflers, sheaths and catalyzer cones.

A particular advantage of the invention is that starting with the sheet coated and marketable as shown above, this same product may undergo a thinning and diffusion treatment to obtain a thin strip, itself usable in particular as an automobile exhaust catalyzer support.

An advantage of the invention compared to the conventional methods of obtaining a strip of the FeCrAl type is that the strip produced according to the invention is manufactured using a coated, stabilized or non-stabilized ferrite steel sheet usable in any other domain, the coating of which contains rare earth elements that will diffuse the steel. In this way, it is no longer necessary for an industrialist to plan for specific castings of special composition steels containing rare earths and/or aluminum, while the conventional ferrite steel composition according to the invention can be used to obtain catalyzer supporting strips.

According to the invention, the process for producing a catalyzer support strip from the coated metal sheet consists of the consecutive operations in which the coated stainless steel sheet is:

cold-rolled to a final thickness in one or more cold-rolling steps, the strip obtained after rolling the coated steel sheet is annealed in a non-oxidizing atmosphere at a temperature of 800° C. to 1,000° C. so as to cause the aluminum of the coating and the rare earth elements and/or yttrium in the sheet to diffuse and form the strip.

The coated steel sheet is cold-rolled, in two steps, for example, an annealing of the strip can be carried out between the two cold-rolling steps, the second step being carried out with a rolling rate of 20% or more of the final thickness intended for the strip, ensuring a final roughness Ra of less than 0.25 µm, with a final thickness of 30 to 50 µm.

The strip is preferably annealed in a hydrogen atmosphere with a dew point less than −30° C., the annealing being carried out statically under a hood or continuously.

In another form, the strip can be annealed in a vacuum.

The strip obtained after annealing can additionally be subjected to a final, continuous, softening annealing at a temperature of 600° C. to 1,200° C., preferably 800° C. to 1,000° C.

To sum up, the stabilized or non-stabilized ferrite steel sheet coated with the aluminum base coating containing the rare earths and/or yttrium is used in particular to produce automobile exhaust sheaths.

This same coated ferritic steel sheet transformed by rolling and diffusion operations into a strip a few microns thick is used in particular as a metal support for a catalyzer.

The strip of the invention can also be used for its electrical resistance properties, for example, in the field of catalyzer reheating, since the material of this strip has a resistance greater than 1.4 µΩm.

The alloying elements such as molybdenum form with oxygen an oxide of the $MoO_3$ type, volatile at temperatures in the 1,000° C. range, which harms the consistency of the oxide layer at the strip surface. For this, the molybdenum content in the steel composition is voluntarily limited to less than 5%.

The aluminum contained in the composition by weight of the steel of the sheet traps the nitrogen contained in the sheet's steel before and during the diffusion annealing operation. Indeed, it has been noted that, with a steel sheet not containing aluminum in its composition, the nitrogen of this steel diffuses toward the steel-aluminum interface where it combines with the aluminum of the coating. At the interface, a layer of aluminum nitride forms that is a source of fragility.

When the steel of the sheet has in its composition contents of aluminum included in the interval according to the invention, the nitrogen of the steel is fixed by the aluminum of this steel in homogenous manner in the form of fine precipitated particles and the nitrogen's diffusion toward the interfaces is eliminated.

According to the invention, the aluminum and nitrogen levels of the sheet's steel composition conform to the following relationship: %Al>2×(%N)+0.30.

The use of a stainless steel sheet containing aluminum facilitates diffusion of the aluminum of the coated sheet. Due to the presence of the aluminum in the steel of sheet, the aluminum content after diffusion is more homogenous between the core and the surface of the strip. The aluminum reserve of the strip is increased.

The diffusion annealing, preferably static, is carried out under hood because the temperature holding time must be sufficiently long. This causes in particular a slow cooling in the inside of the strip coils and thus causes the strip the become more fragile at 475° C.

During the diffusion annealing, the roughness Ra of the strip is brought to a level in the micron range.

According to the invention, the strip may undergo a finishing rolling ensuring a final roughness Ra of less than 0.25 µm and preferably less than or equal to 0.1 µm, with the finishing rolling preferably followed by a final continuous annealing.

The smooth surface state favoring the characteristics of use as a catalyzer support is obtained by cold-rolling the strip after diffusion annealing, the cold-rolling reduction rate being greater than 20% by using polished rolling rollers for the last two rolling runs.

The final annealing carried out between 600° C. and 1,200° C. and preferably between 800° C. and 1,000° C. is a continuous annealing followed by a rapid cooling at a cooling speed greater than 25° C. per second. This annealing makes it possible to eliminate the fragility of the metal created during the diffusion annealing.

The surface state of the strip obtained according to the invention's process, smoothed during the last continuous finishing rolling runs and with a suitable roughness, preferably below 0.1 µm, makes it possible to obtain an excellent useful life facilitating the mixing operations. Non-oxidizing metal indeed appears at the surface during this rolling.

Figure 2:
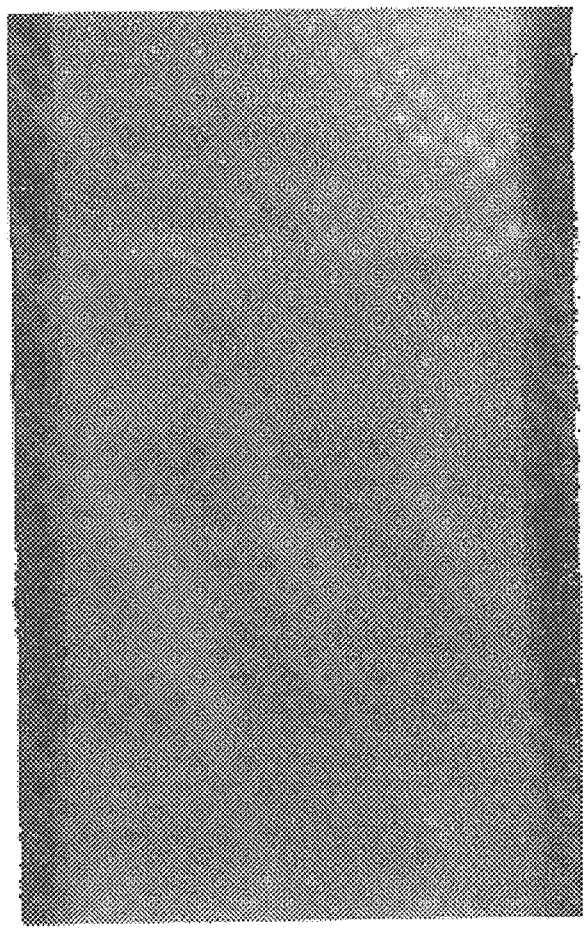
FIG. 2 is a photo of a section of a sheet stated to be 17% chromium, intended for any commercial use, and on which an aluminum coating was deposited by dipping, according to the invention.

FIG. 2 is a photo of a section of a sheet stated to be 17% chromium, intended for any commercial use and on which an aluminum coating was deposited by dipping, according to the invention.

In this example, the sheet used is a commercial ferritic steel sheet stated to be 17% non-stabilized chromium, a stainless steel sheet containing in composition by weight:

chromium=16% aluminum=0.40% carbon=0.039% nitrogen=0.03% silicon=0.47% manganese=0.41% sulfur=4 ppm and the rest Fe and the inevitable elements.

The metal sheet, 0.4 mm thick, is annealed in a furnace under a non-oxidizing atmosphere containing hydrogen and with a dew-point of less than −50° C. The annealed metal sheet is then dip-coated in an aluminum bath containing 1.5% rare earth in the form of mixed metal, namely 30% lanthanum, 49% cerium, 7% praseodymum, and iron. The coating deposited on each face of the stainless steel sheet is approximately 35 µm thick.

In a first form of the example, the sheet obtained can be marketed as is, particularly for producing automobile exhausts, since the corrosion resistance of the coated metal sheet is improved compared to non-coated sheets or compared to conventional aluminum-alloyed sheets due to the presence of rare earths in the coating.

Figure 3A:
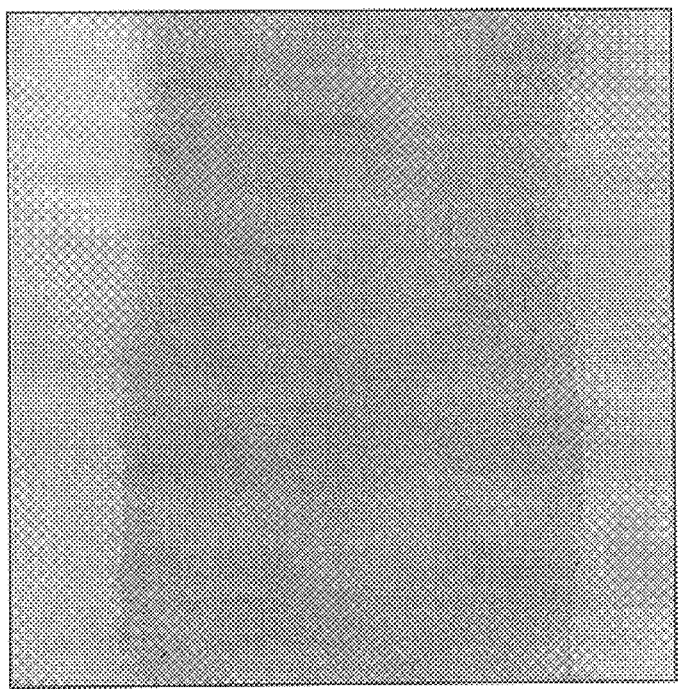
FIGS. 3A and 3B show photos of an FeCrAl strip according to the invention, after diffusion annealing and after an oxidation test at 1,000° C. for 400 hours.
Figure 3B:
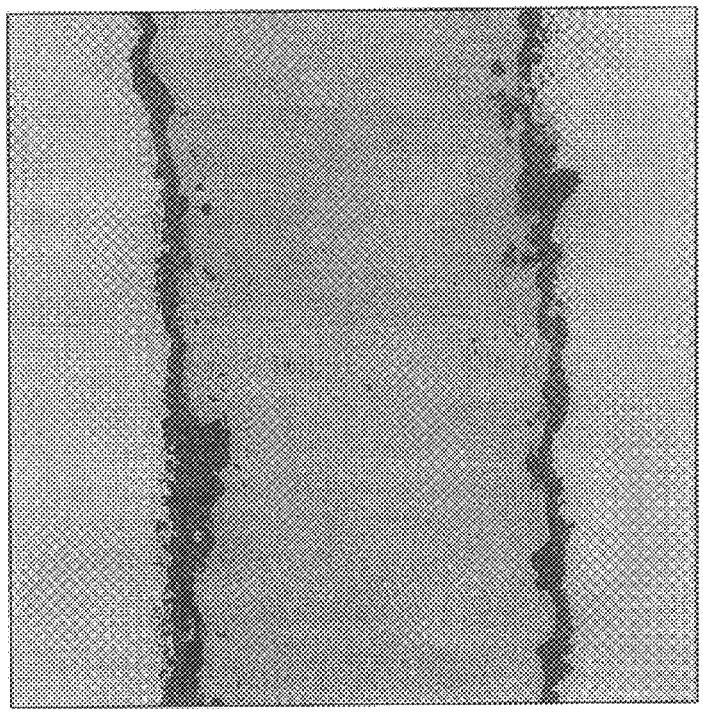

FIGS. 3A and 3B show, respectively, photos of a strip according to the invention after cold-rolling and diffusion annealing and a strip after the oxidation test at 1,000° C. for 400 hours.

To produce a strip compatible with the industrialist's needs, the steel of FIG. 2 is subjected to a cold-rolling up to a thickness of approx. 50 µm. The strip obtained is subjected to a diffusion annealing of 15 hours at 900° C. under vacuum. The strip obtained after diffusion is of the FeCrAl type and the following composition:

aluminum: 6% cerium: 260 ppm lanthanum: 120 ppm chromium: 15.5% the rest being iron and impurities.

Figure 4:
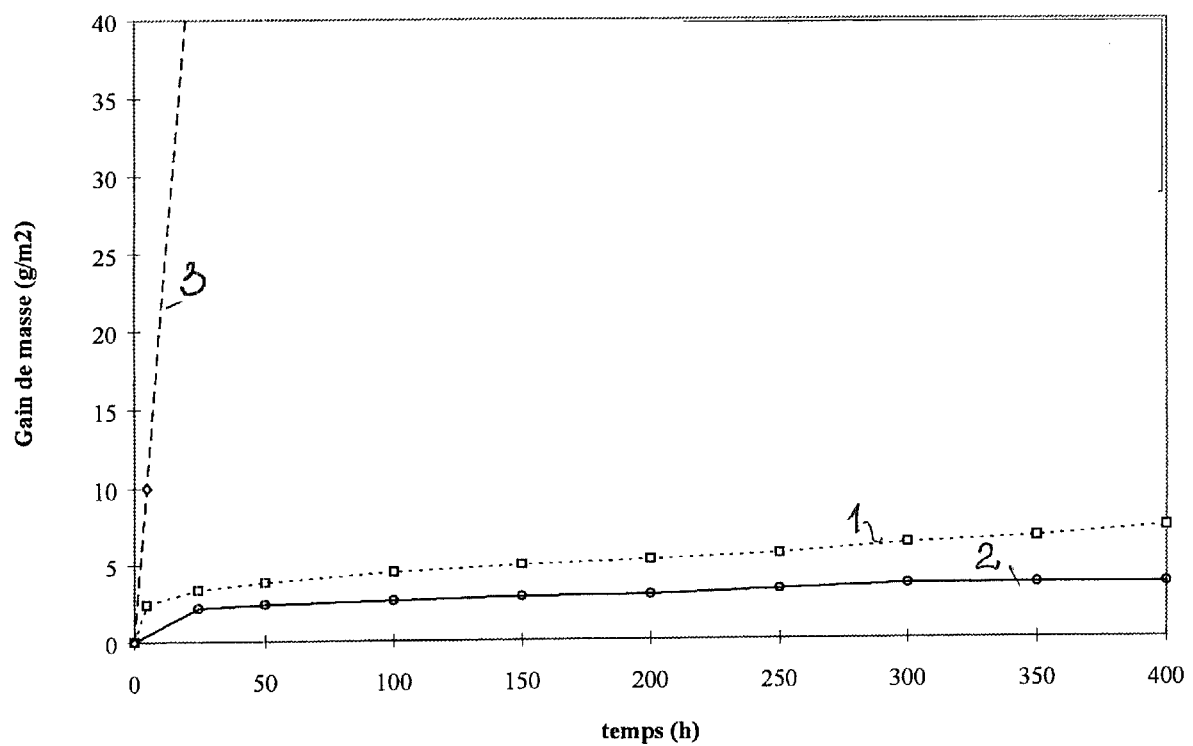
FIG. 4 shows a mass gain curve for the strip according to the invention and two other mass gain curves for two comparison strips.

The comparison of FIGS. 3A and 3B shows the very low damage done to the strip after the oxidation test. The mass gain measure as a function of time, as presented in FIG. 4, also shows that the aluminum-dipped strip shown by curve 1 with mixed metal in the bath resists oxidation quite well, as long as a massive FeCrAl obtained by continuous casting shown by curve 2. No catastrophic oxidation is noted, and the strip's appearance remains attractive.

Curve 3 shows the mass gain of a ferrite steel with 17% non-coated chromium.

In a second form of the example, the strip obtained is marketed as is, in particular for producing metal supports for catalyzers and electric resistance. The strip proposed is quite economical, and resists corrosion as long as the FeCrAl strips obtained by continuous casting.

What is claimed is:

1. A dip-coated ferritic stainless steel sheet usable in an automobile exhaust sector comprising a steel core with the following composition by weight:

10.5%<chromium≦20%;
0%≦aluminum≦0.6%;
0.003%≦carbon≦0.06%;
0.003%≦nitrogen≦0.03%;
0%≦silicon≦0.6%;
0%≦manganese≦0.6%;
0%≦sulfur≦0.002%; and
the balance iron and impurities inherent in processing, and
a metal coating deposited on said steel core, wherein said metal coating comprises aluminum and at least one element selected from the group consisting of cerium, lanthanum, praseodymium and neodymium, and wherein said metal coating is deposited by dipping said steel core in a molten metal bath comprising aluminum and said at least one element selected from the group consisting of cerium, lanthanum, praseodymium and neodymium.

2. A dip-coated ferritic stainless steel sheet usable in an automobile exhaust sector comprising a steel core with the following composition by weight:

10.5%≦chromium≦20%
0%≦aluminum≦0.6%
0.003%≦carbon≦0.06%
0.003%≦nitrogen≦0.03%
0%≦silicon≦0.6%
0%≦manganese≦0.6%
0%≦sulfur≦0.002% and
the balance iron and impurities inherent in processing, and
a metal coating deposited on said steel core, wherein said metal coating comprises aluminum and yttrium and wherein said metal coating is deposited by dipping said steel core in a molten metal bath comprising aluminum and yttrium.

3. The dip-coated ferritic stainless steel sheet according to claim 1 or 2, wherein the steel core has at least 18.5% chromium in its composition.

4. The dip-coated ferritic stainless steel sheet according to claim 1 or 2, wherein said metal coating contains said at least one element selected from the group consisting of cerium, lanthanum, praseodymium and neodymium in an amount lower than 3.0%.

5. The dip-coated ferritic stainless steel sheet according to claim 1 or 2, wherein the metal coating comprises 6% to 13% silicon, the silicon being introduced into the molten metal bath of aluminum.

6. The dip-coated ferritic stainless steel sheet according to claim 1 or 2, wherein the steel core comprises less than 0.6% aluminum and less than 0.02% nitrogen and the carbon and nitrogen levels conform to the relationship: (C+N)<0.04%.

7. The dip-coated ferritic stainless steel sheet according to claim 1 or 2, wherein the steel additionally comprises at least one stabilizing element selected from the group consisting of titanium, zirconium and niobium, and the amount of said stabilizing element(s) is less than or equal to 0.6%.

8. The dip-coated ferritic stainless steel sheet according to claim 1 or 2, wherein the steel core additionally comprises in composition less than 1.5% copper and/or less than 1% nickel and/or less than 5% molybdenum.

9. An automobile tube, muffler, sheath, or catalyzer cone made from a ferritic stainless steel sheet coated according to one of claims 1 or 2.

10. A metal supporting strip for an automobile catalyzer made from the dip coated ferritic stainless steel sheet according to one of claims 1 or 2.

11. The dip-coated ferritic stainless steel sheet according to claim 2, wherein said metal coating contains yttrium in an amount lower than 3.0%.

12. A ferritic stainless steel strip containing aluminum having the following composition by weight:

10.5%≦chromium≦20%;
0%≦aluminum≦8.0%;
0.003%≦carbon≦0.06%;
0.003%≦nitrogen≦0.03%;
0%≦silicon≦0.6%;
0%≦manganese≦0.6%;
0%≦sulfur≦0.002%;
0.001% or greater of an element selected from the group consisting of Ce, La, Pr, Nd and yttrium; and
1.0% or greater iron and impurities inherent in processing, wherein the chromium and aluminum levels conform to the relationship Cr/%Al<5.

13. A process for producing the metal supporting strip of claim 10, comprising:

cold rolling the coated ferritic stainless steel sheet in at least one rolling step to obtain a steel strip, and
annealing the steel strip in a non-oxidizing atmosphere at a temperature of 600° C. to 1,200° C. so as to cause the metal of the coating to diffuse into the steel to form the strip.

14. The process according to claim 13, wherein the coated steel sheet is cold-rolled in two steps, with an optional intermediate annealing step, the second cold rolling step being carried out with a rolling rate of 20% or more, wherein the final roughness Ra is less than 0.25 μm.

15. The process according to claim 13, wherein the coated steel sheet is cold-rolled until reaching a final thickness of 30 to 50 μm.

16. The process according to claim 13, wherein the strip and the coated metal sheet are annealed in a hydrogen atmosphere with a dew point less than −30° C., the annealing being carried out statically or continuously.

17. The process according to claim 13, wherein the strip is subjected to a final, continuous, softening annealing at a temperature of 600° C. to 1,200° C.

18. The process of claim 13, wherein said annealing temperature is from 800° C. to 1,000° C.

19. The process of claim 17, wherein said final annealing temperature is from 800° C. to 1,000° C.

20. The process according to claim 14, wherein the strip and the coated metal sheet are annealed in a hydrogen atmosphere with a dew point less than −30° C., the annealing being carried out statically or continuously.

21. The process according to claim 14, wherein the strip is subjected to a final, continuous, softening annealing at a temperature of 600° C. to 1,200° C.

22. A process for producing the metal supporting strip of claim 10, comprising:

annealing the ferritic stainless steel sheet in a non-oxidizing atmosphere at a temperature of 600° C. to 1,200° C., so as to cause the metal of the coating to diffuse into the steel and rolling the sheet subjected to diffusion in at least one rolling step to obtain a strip.

23. The process of claim 22, wherein said annealing temperature is from 800° C. to 1,000° C.

24. The process according to claim 22, wherein the strip and the coated metal sheet are annealed in a hydrogen atmosphere with a dew point less than −30° C., the annealing being carried out statically or continuously.

25. The process according to claim 22, wherein the strip is subjected to a final, continuous, softening annealing at a temperature of 600° C. to 1,200° C.

* * * * *